United States Patent
Vassallo

(10) Patent No.: US 7,333,000 B2
(45) Date of Patent: Feb. 19, 2008

(54) TRACKING SYSTEM AND METHOD FOR ELECTRICALLY POWERED EQUIPMENT

(75) Inventor: Godfrey Vassallo, Northport, NY (US)

(73) Assignee: Afco Systems Development, Inc., Melville, NY (US)

( * ) Notice: Subject to any disclaimer, the term of this patent is extended or adjusted under 35 U.S.C. 154(b) by 233 days.

(21) Appl. No.: 10/987,620

(22) Filed: Nov. 12, 2004

(65) Prior Publication Data

US 2006/0103504 A1 May 18, 2006

(51) Int. Cl.
*G05B 19/00* (2006.01)
*G06F 7/00* (2006.01)
*G08B 29/00* (2006.01)
*H04B 1/00* (2006.01)
*H04Q 1/00* (2006.01)

(52) U.S. Cl. .................. 340/5.92; 340/652; 340/656; 340/572; 340/310

(58) Field of Classification Search .............. 340/5.92, 340/652, 656, 572, 568, 310, 825.36, 825.37; 700/90, 104; 307/38–40, 139–140

See application file for complete search history.

(56) References Cited

U.S. PATENT DOCUMENTS

| | | | | |
|---|---|---|---|---|
| 4,418,333 A | * | 11/1983 | Schwarzbach et al. . | 340/310.11 |
| 4,703,306 A | * | 10/1987 | Barritt ................... | 340/310.18 |
| 5,021,779 A | * | 6/1991 | Bisak ..................... | 340/825.69 |
| 5,434,775 A | * | 7/1995 | Sims et al. .................... | 705/8 |
| 5,689,242 A | * | 11/1997 | Sims et al. ................. | 340/652 |
| 6,005,476 A | * | 12/1999 | Valiulis ................. | 340/310.11 |
| 6,112,127 A | * | 8/2000 | Bennett ....................... | 700/86 |
| 7,069,091 B2 | * | 6/2006 | Williamson .................. | 700/90 |

* cited by examiner

*Primary Examiner*—Brian Zimmerman
*Assistant Examiner*—Nam Nguyen
(74) *Attorney, Agent, or Firm*—Scully, Scott, Murphy & Presser, P.C.

(57) ABSTRACT

A novel system and method for simplifying the management of electronic equipment such as computers, networks, and equipment and communications systems. The system tracks equipment that has been registered in an inventory database without any user involvement. Once registered and connected into the system's power source device, the equipment's location will be easily tracked without human intervention. This information may be used to locate systems in need of up grade, repair or relocation, and further can verify that the correct equipment was moved and that it was moved to the correct location.

20 Claims, 4 Drawing Sheets

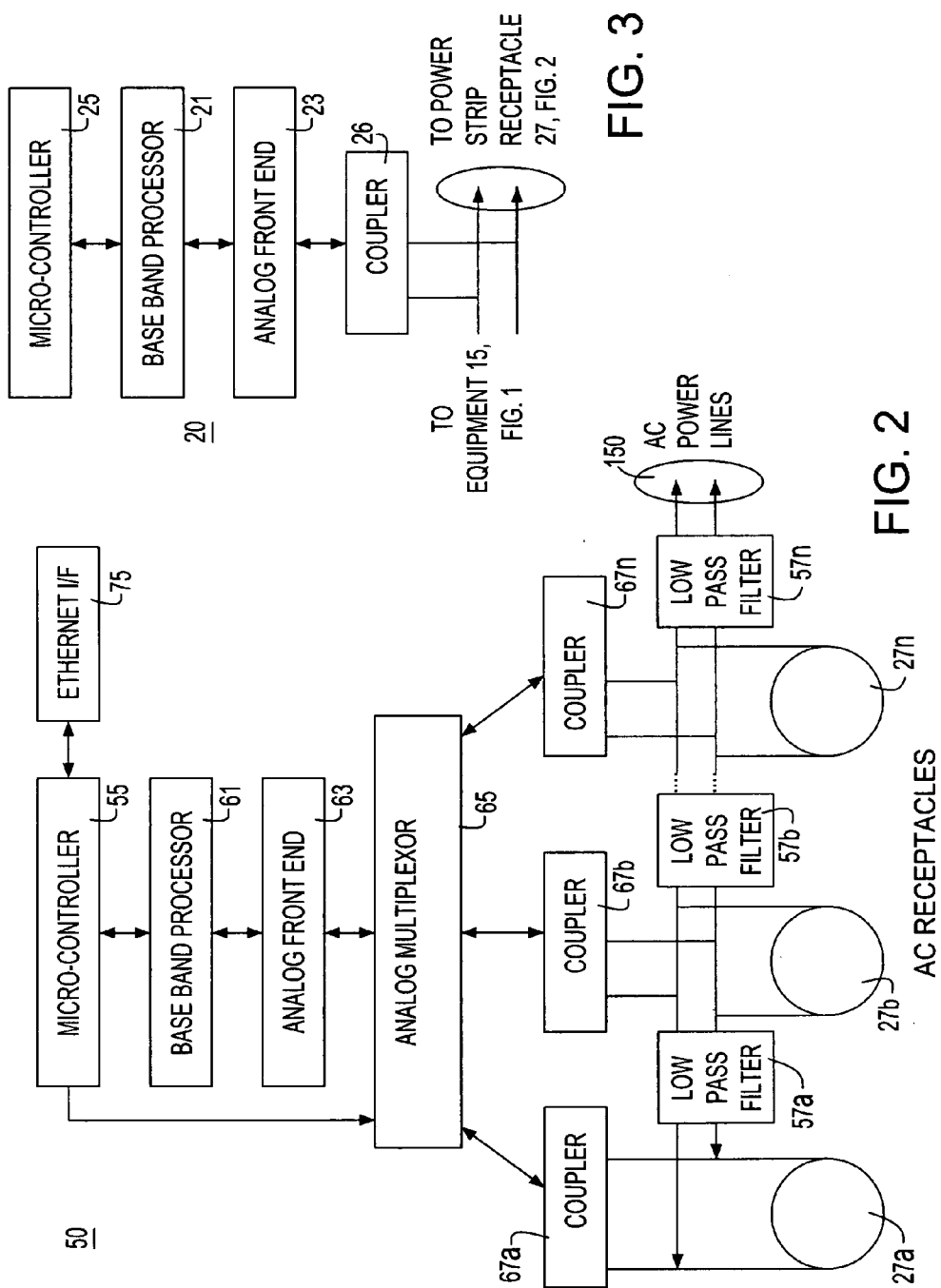

US 7,333,000 B2

TRACKING SYSTEM AND METHOD FOR ELECTRICALLY POWERED EQUIPMENT

FIELD OF THE INVENTION

The present invention relates generally to electrical power consumption, controlling power availability, and locating electrical equipment, and more particularly to a novel smart power distribution apparatus for locating and tracking electrical equipment.

BACKGROUND OF THE INVENTION

In both business and/or domestic environments having a multiplicity of electrically powered devices such as computers, communications and business related equipment the tracking of such equipment is a daunting task. Typically, inventories of such electrically powered equipment that require standard alternating current power source, e.g., provided by a power strip or wall outlet, require manually entry into an equipment log or database (whether local or centralized). Furthermore, when such equipment is moved to a new location, its movement is tracked through a manual system that requires physical inspection and manual entry into the equipment log or database. This manual system is error prone, and for environments with very large inventories of such equipment, the database is subject to error. These errors present major difficulties when equipment needs to be upgraded or repaired. In fact, an out of date database will introduce new problems since repair technicians may end up working on equipment that is in fact operating correctly.

It would be highly desirable to provide a tracking solution for electrical-powered equipment that obviates the need for manual involvement (i.e., data entry).

SUMMARY OF THE INVENTION

It is thus an object of the present invention to simplify the management of electrically powered electronic equipment such as computers, networks, and communications equipment and systems by providing a mechanism to track equipment that has been registered in an inventory database without any action on the part of the user.

This invention addresses directly a system and method for automatically tracking such electrical-powered assets that require an alternating current power source, e.g., provided by a power strip, wall outlet, or like electrical power source.

According to the invention, a manual procedure is performed when the equipment is first brought into service whereby each piece of equipment to be tracked is assigned a unique pod device having a unique serial number associated therewith. The pod's serial number and equipment description are entered into a database, e.g., by manual means. The pod is then fixedly secured to the corresponding piece of equipment's electrical power receptacle. The equipment is then subsequently connected into an intelligent power strip equipped with a control device receiving power from the power grid. The intelligent power strip functions to obtain the pod's serial number and report its location to inventory management software executing in a local or remotely located workstation. The pod is able to report its serial number independent of the host equipment.

Thus, according to a preferred embodiment of the invention, there is provided a system and method for managing inventory of electrically-powered devices serviced by an electrical power source, the system comprising:

a power source device having a plurality of power line receptacles adapted for distributing power from the electrical power source to each of electrically-powered devices;

a plurality of identification devices each for attachment to an electrically-powered device and connected to a power line receptacle for providing electrical power to a respective device via the receptacle, each the identification device including a unique identifier associated therewith indicating its connected electrically-powered device;

an inventory management control device that communicatively couples to each of the plurality of identification devices via a respective power line receptacle over a communications link, wherein the inventory management control device communicates with each of the identification devices to determine the unique identifier of the connected identification device, thereby tracking the electrically-powered device connected to the receptacle of the power source device.

The inventory management control device of the system comprises a means for polling each power source device with a query message signal for determining unique identifiers of all identification devices connected to its power line receptacles, each connected identification device generating a response message signal providing its unique identifier to the control device.

The inventory management control device further comprises a means providing a mapping of each unique identifier associated with identification devices predetermined as being connected to a power line receptacle at the power source device; and, means for comparing each unique identifier communicated in the response message signal against the mapped predetermined connected receptacle. In this manner, the system verifies whether the unique identifier is associated with a device predetermined as being connected that power line receptacle.

Advantageously, the system and method of the invention tracks equipment that has been registered in an inventory database without any user involvement. Once registered and connected into the system's power source device, the equipment's location may be easily tracked without human intervention. This information may be used to locate systems in need of up grade, repair or relocation, and further, can verify that the correct equipment was moved and that it was moved to the correct location.

BRIEF DESCRIPTION OF THE DRAWINGS

The objects, features and advantages of the present invention will become apparent to one skilled in the art, in view of the following detailed description taken in combination with the attached drawings, in which:

FIG. 2 is a block diagram of the intelligent power strip 50 and its associate electronics for providing a powerline based communications according to the invention;

FIG. 3 is a block diagram of the equipment identification pod 20 according to the invention;

DETAILED DESCRIPTION OF THE PREFERRED EMBODIMENTS

Figure 1:
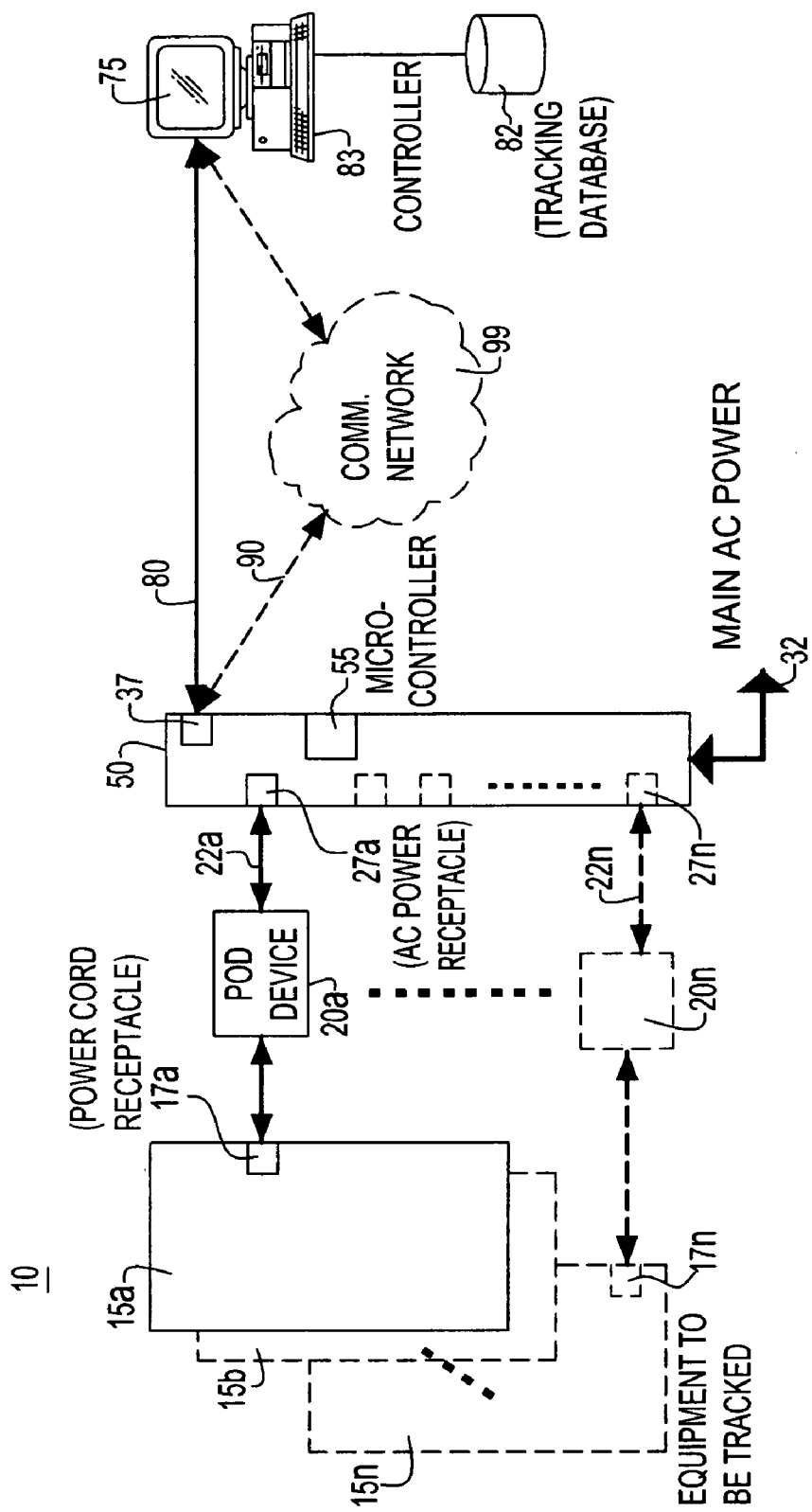
FIG. 1 depicts a preferred embodiment of the asset tracking system 10 of the invention.

With reference to the accompanying drawings, FIG. 1 depicts a preferred embodiment of the tracking system 10 of the invention. As depicted in FIG. 1, each of a plurality of electrically powered equipment/devices 15a, ..., 15n to be tracked is assigned a respective pod device 20a, ..., 20n that plugs into its power intake or power cord receptacle 17a, ..., 17n and, is affixed or otherwise secured to the equipment housing or, alternately, mounted internally. Affixation of a pod device 20 to the power receptacle of equipment/device 15 may be accomplished by any conventional means, e.g., a mounting bracket and screws that physically mount the pod to the piece of equipment. Then a standard power cord 22a, ..., 22n adapted for providing AC power to the equipment/device 15 is connected to the respective pod device 20a, ..., 20n and to respective AC power receptacles or sockets 27a, ..., 27n on the "intelligent" power source device, e.g., power strip 50. The intelligent power strip 50 comprises a microcontroller device 55 including firmware programmed to select or "poll" one power cord receptacle 17a, ..., 17n at a time, and issue a request for transmission of the respective attached pod's serial number, in the manner as will be explained in greater detail herein. The power strip 50 is connected to a main power grid where the equipment is located through its main AC power lines 32. A communication system including a network interface 37, e.g., an Ethernet interface, is provided with the power strip 50 that enables high speed communication with a remotely located control device 75, embodied as a workstation or server 83. The control device 75, preferably, a Kool-SCAN™ controller product (Kool-SCAN is a Trademark of AFCO systems, Inc., www.afcosystems.com), is programmed to obtain information from the power strip through this interface and track equipment assets via an equipment/device inventory maintained in an attached memory storage device, e.g., a database 82, for tracking inventory. As will be explained, via the workstation 83, a user may enter specific asset tracking queries; otherwise, the system provides default queries enabling asset tracking functionality as described herein.

More particularly, the Kool-Scan™ controller 75 implements the layers of the software TCP/IP stack provided with the Simple Network Management Protocol (SNMP), e.g., SNMPv1, SNMPv2c, or SNMPv3, that is used to communicate with the microcontroller device 55 of the power strip device directly over high speed communications path 80 which may be a fiber optic cable, coaxial cable, telephone line, wireless communication path, and/or any communication medium that allows two devices to transmit analog and/or digital information there between. As shown in FIG. 1, TCP/IP communications between controller 75 and the microcontroller device 55 of the power strip may optionally occur via a network connection 90 over a communication network 99 which may comprise a Local Area Network (LAN), a Wide Area Network (WAN), a wireless network, a Public Switched Telephone Network (PSTN), an Ethernet network, or an Internet Protocol (IP) network such as the Internet, a corporate intranet or an extranet, or any other public or private network environment that routes data amongst a plurality of users as electrical signals and/or as light waves. The controller 75 executes a polling algorithm that will monitor the returned status information from the power strips 50. Some of this information will be used to issue SNMP "traps" which signal a fault condition. The aforementioned Kool-Scan™ controller already provides other information that is used to track environmental conditions of enclosed equipment associated with a particular strip. That is, the Kool-SCAN™ controller is an integral component of a data center monitoring and management system that receives equipment status, displays status, and generates alarm and event notifications.

FIG. 2 is a block diagram of the intelligent power strip 50 and its associate electronics for providing a powerline based communications. As shown in FIG. 2, the sockets 27a, ..., 27n on the intelligent power strip 50 connects with AC main power lines 150 providing single-phase or multiphase voltage, e.g., 120 volt AC (VAC) or 240 VAC, used in powering computers, communications equipment, test equipment, printers, facsimile machines, audio equipment, video equipment, electronic devices, and the like. As shown in FIG. 2, each socket 27a, ..., 27n on the intelligent power strip 50 is decoupled and isolated from each adjacent socket by respective low pass filter circuit devices 57a, ..., 57n.

Referring to FIG. 2, the intelligent power strip 50 further includes a microcontroller device 55 comprising firmware programmed to generate signals that select or "poll" a power cord receptacle 17a, ..., 17n on the corresponding piece of equipment 15a, ..., 15n at a time via an analog multiplexor device 65 and respective coupler devices 67a, ..., 67n. Particularly, in response to receipt of a periodic or asynchronous tracking query from the controller 75, the microcontroller device 55 issues a request for transmission of the respective attached pod's serial number. If a pod 20a, ..., 20n responds, then its serial number is recorded along with the socket 27a, ..., 27n identification number. If a pod does not respond, then it is assumed that either the socket is empty or a device with out a pod is plugged in it. It should be understood however, that a corresponding piece of equipment 15 does not need to be powered up in order for the system 10 to track it. That is, a pod device 20a, ..., 20n is able to report its serial number independent of the host equipment. Naturally, a piece of equipment that is not plugged into one of the smart power strips 50 cannot be tracked in this manner. Thus, when the equipment is to be removed from the inventory an administrator must manually notify the inventory tracking database 82.

In operation, microcontroller firmware selects the receptacle 17a, ..., 17n to communicate with through the analog multiplexor 65 that routes the corresponding signal lines to/from an analog front end device 63. The pods connected to the individual sockets are isolated from one another through the use of low pass filter devices 57a, ..., 57n. The pods particularly communicate with the microcontroller in a frequency band ranging between about 4.0 MHz and about 21 MHz, however, other frequency ranges may be implemented. According to the invention, information and data transmitted between the pod devices 20a, ..., 20n and power strip via respective AC power sockets 27a, ..., 27n over the respective power cords 22a, ..., 22n are carried on the AC power signals using a frequency division-multiplexing scheme, e.g., Orthogonal Frequency Division Multiplexing Modulation (OFDM). It is understood however, that the system may transfer data over the AC power lines using any modulation protocol including but not limited to: amplitude modulation, frequency modulation, frequency shift keying FSK, phase shift keying, QSPK, quadrature amplitude modulation (QAM), discrete multi-tone modulation, and/or spread spectrum modulation.

Although not shown in FIG. 2, it is understood that the analog front end 63 includes a transmitter sub-system that implements a digital to analog converter (DAC) component (not shown), an image rejection filter and a line driver to provide analog signal transmission requests to the pods 20a, . . . , 20n via their respective sockets 27a, . . . , 27n; and, a receiver sub-system including circuits that implement automatic gain control (AGC), anti-aliasing filtering, high pass signal filtering and analog to digital conversion (ADC) for receiving and processing the respective analog signal transmissions from the pod devices 20a, . . . , 20n. That is, the analog front end device 63 transmits and receives OFDM signals to and from the AC power line connecting the pods.

As further shown in FIG. 2, the intelligent power strip 50 further comprises a Base Band Processor 61 that combines the functionalities associated with Media Access Control (MAC), i.e., data link layer 2 of the Open System Interconnection (OSI) protocol stack, with the Physical (PHY) layer, i.e., physical layer 1 of the OSI protocol stack, for enabling wired or wireless network communication connectivity. The micro-controller device 50 particularly provides data encapsulated in standard packets to the Base Band processor 61 prior to transmitting the pod request transmission. The Base Band processor 61, through its firmware, will prepare the packet data for transmission to the analog front end using the ADC component in the front end 63. When receiving transmissions back from the pods, the Base Band processor then formulates the data into frames, which are passed to the micro-controller 55 for processing. Those frames whose destination address does not match that of the micro-controller are rejected. The frames whose address matches are processed and the pod's serial number information is removed from the received frame. The micro-controller then records this serial in a record that corresponds to power strip socket from which it was received.

When the micro-controller 55 is polled for information about the devices plugged into its receptacles it will report the serial number of the pod and the corresponding socket to the management software. The power strip's micro-controller 55 firmware does not issue information to the outside world without a request. It is the responsibility of the management software executing at the controller 75 to poll the power strip in order to obtain updated status information.

FIG. 3 is a block diagram of the equipment identification pod 20. Generally, the equipment identification pod 20 includes the same devices as the power strip including the microcontroller 25, base band processing 21, analog front end 23, and coupler 26 functions, and perform the same functions in the pod 20 as they do in the power strip 50. However, the pod's firmware is the same for each pod 20a, . . . , 20n. Furthermore, the micro-controller 25 for each pod has a unique serial number associated therewith that is transmitted to the power strip 50 in response to an issued request. That is, the pod 20 performs only one data function: to transmit its serial number when requested. Naturally, this implies that it must be able to receive and understand the request. The pod additionally functions to pass the AC power from the power strip socket to the receptacle 17 of the connected equipment 15.

Figure 4:
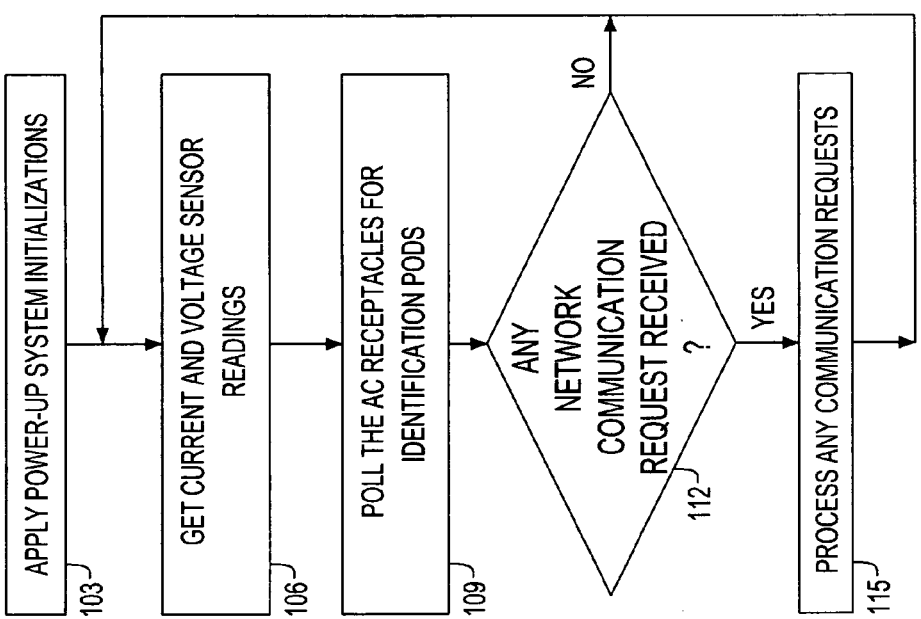
FIG. 4 depicts a high level processing flow for the intelligent power strip device according to the present invention.

FIG. 4 depicts a high level processing flow 100 for the intelligent power strip device As shown in FIG. 4, in a first step 103, the power strip system is powered-up and all I/O sub-systems are initialized. Furthermore, this step represents the setting up of the firmware state machine. A self-test of the power strip functionality may additionally be run. Then, as indicated at step 106, the system obtains current and voltage sensor readings including substeps of: selecting sensor and configuring of the analog port; sampling one complete cycle's data; and computing an RMS and curve fit the results. It is understood that this step is part of its intelligence capabilities for reporting power availability, amperage consumption and load balancing of power strips to the Kool-SCAN™ controller device 75. Then, as indicated at step 109 the power strip microcontroller system polls the AC sockets for identification pods as part of its device/equipment tracking process. Particularly, the polling step includes sub-steps of: selecting an individual socket of the power strip to poll; configuring the analog multiplexor to exclude all other receptacles; issuing an identification request signal for transmission via the receptacle and its connected power cord to the identification pod; and recording the pod's identification number or the missing pod code. In this manner, a pod that is previously registered (enrolled in the system) and plugged into the system's power strip, will enable the corresponding equipment's location to be easily tracked without human intervention. Then, as indicated at step 112, a determination is made as to whether any communication requests have been received from the controller either directly or via the network connection. This requires reading of the network interface to check for any input. If no communication request has been received from the controller, the process returns to step 106. If a communications request has been received from the controller, then at step 115, the received communication request is processed. For example, a request from the controller may be to locate a device/equipment in need of up grade, repair or relocation, e.g., the controller may seek to verify that the correct equipment was moved and that it was moved to a correct location.

Figure 5:
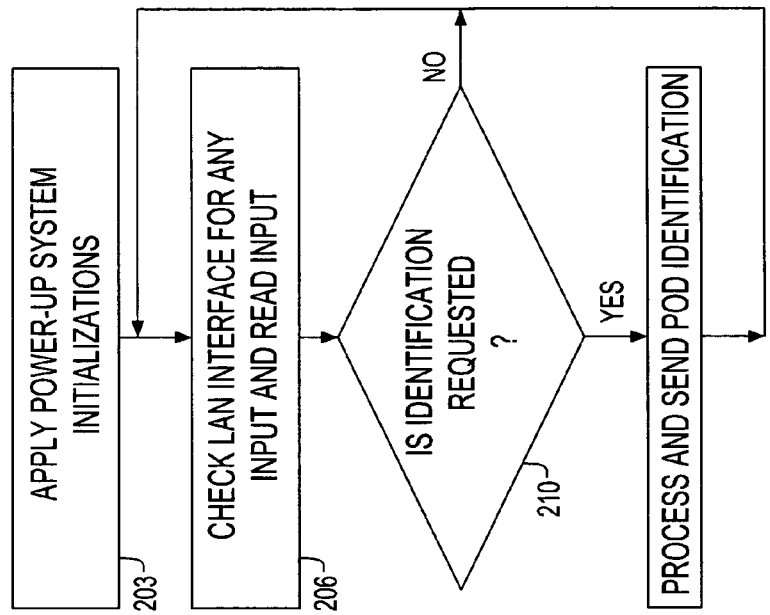
FIG. 5 depicts a high level processing flow for the equipment identifying pod of the present invention.

FIG. 5 depicts a high level processing flow 200 for the equipment pod. As shown in a first step 203, the pod is powered-up and all I/O sub-systems are initialized. Furthermore, this step represents the setting up of the firmware state machine. A self-test of the pod functionality may additionally be run. Then, as indicated at step 206, a determination is made as to whether a power strip identification request has been communicated from the controller via the power strip. This requires reading of the network interface to check for any input as indicated at step 206 and determining at step 210 whether a pod identification request has been received. If no communication request has been received from the controller the process is idle and returns to step 106 to wait until a request is received. If a communications request has been received from the controller, then, at step 115, that received communication request is received by the pod, processed, and responded to by sending out to the controller the POD identification.

Referring back to FIG. 1, the asset track software executed at controller device 75 periodically polls each power strip(s) 50 and queries for a report of the equipment attached to sockets 27a, . . . , 27n. In one embodiment, the message communicated by the controller may comprise a one byte TCP/IP message addressed to one power-strip 50 at a time. The power strip(s) 50 will respond with the electrical data that it has collected (e.g., current and voltage per phase), identification data, and an inventory. The identification data indicates to the controller's polling program the power strip type and location information such as where it is located in a cabinet or enclosure (e.g., cabinet number 45 left side). The inventory data further includes the power strip socket number and, the assigned tracking pod id (asset serial number, e.g., '21,563789') plugged into it. Preferably, a special serial number is allocated to represent an empty power strip receptacle (e.g., all zeros '000000') and another to non-tracked assets. These non-tracked assets do not have a pod assigned to them but are allocated a fixed socket.

Figure 6:
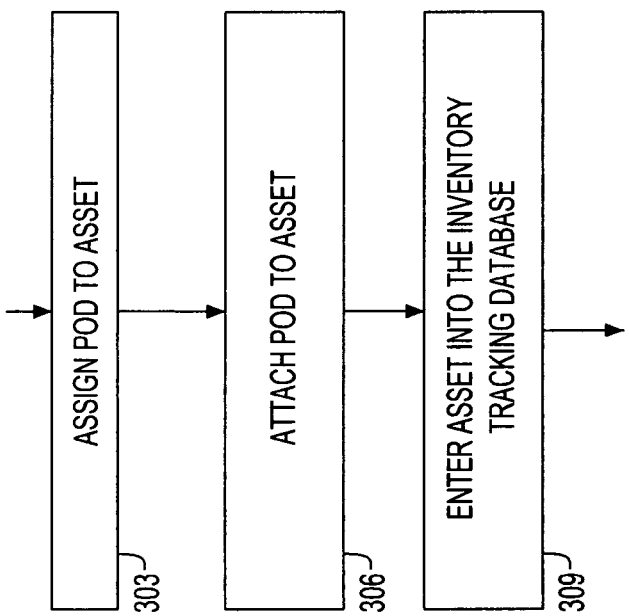
FIG. 6 depicts a high level processing flow for enrolling an asset into the controller tracking system; and, FIG. 7 depicts an example flow process of the asset tracking software in an automated track mode according to the principles of the invention.

Referring back to FIG. 1, as mentioned, the controller device 75 obtains information from the power strip through a network interface to track equipment assets from information stored in the equipment/device inventory database 82. Thus, when a new asset is acquired, it is first enrolled into the database. As shown in FIG. 6, the enrollment procedure includes steps of assigning a tracking pod id (i.e., asset serial number) with a piece of equipment that it will be attached to (step 303). Then, at step 306, the physical pod is attached to the asset and at step 309, the asset and associated information into the inventory tracking database. In an exemplary embodiment, three (3) tables of information are maintained in the memory storage device and which are queried by the controller's asset tracking software including: 1) a "Power-strip Description Table" providing data including, but not limited to, the MAC Address and IP Address fields, a Power-strip type, and descriptor, e.g., the location of the power strip device; 2) a "Power-strip Contents Table" providing data, but not limited to, the Power-Strip MAC Address, socket or receptacle number, and, an asset serial number, i.e., the assigned tracking pod id mapped with the associated power strip socket; and 3) an "Asset Description Table" providing data, but not limited to, the asset serial number and asset description, i.e., the equipment or device associated with the pod id.

In one embodiment of the invention, the controller software may be configured to track assets in various modes. For instance, in an "alarm" mode, the software will generate an alarm if a poll reveals that a power strip socket connects with an asset other than the one assigned to it. In a "track" mode, the power strip(s) is(are) polled periodically to provide a report(s) that lists all the power strips and their attached assets. Via a user interface associated with workstation 83 (FIG. 1) a user may additionally input a specific on-line query including, but not limited to, the following types of example queries: 1) what is in power-strip 000BDB561949?; 2) where is asset 879632?; 3) report all power-strips with empty receptacles; and/or, 4) report all power-strips of a specific type having two or more empty receptacles.

Figure 7:
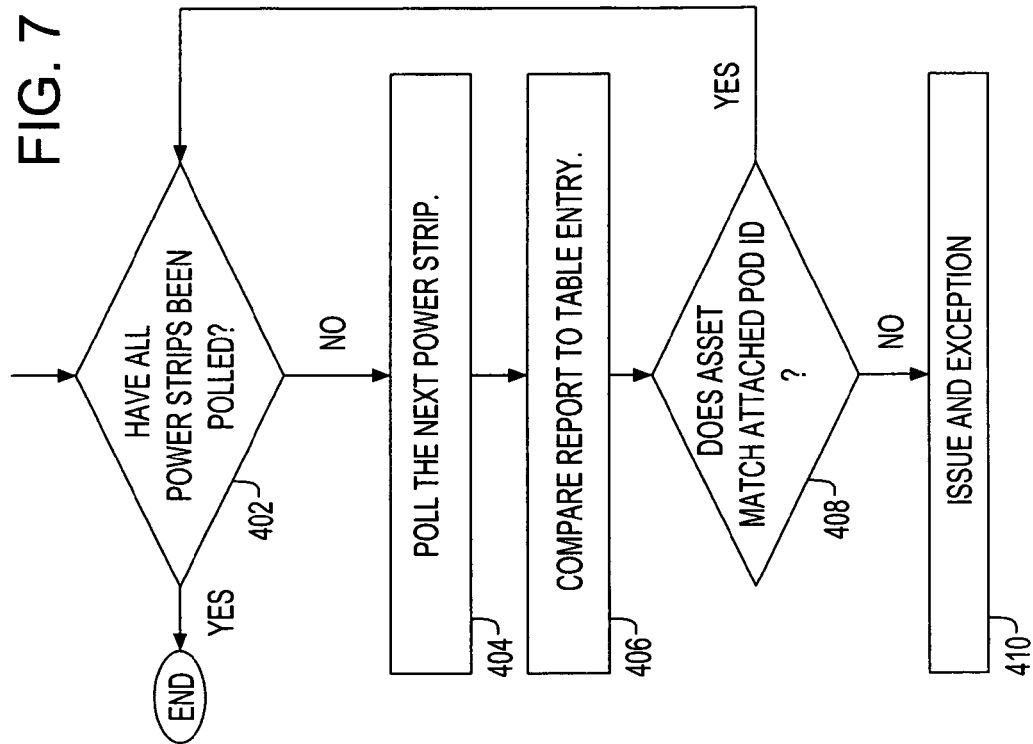

In an exemplary embodiment as shown in FIG. 7, the asset tracking software in the automated track mode will continuously poll each power strip sourcing a rack mount enclosure, system or room full of electrically-powered equipment. A first step 402 depicted in FIG. 7 is a determination of whether each of the power strips at the particular location have been polled. If all of the power strips have been polled, then the process terminates until a next polling cycle is initiated. Otherwise, if all the power strips have not been polled, then the process proceeds to step 404 where the next power strip at the location is queried. In response to this step, the pods in communication with the polled power strip reports to the controller device the attached assets to that polled power strip (in the form of the assigned tracking pod ids). Then, at step 406, a comparison is made as to whether the reported assigned tracking pod ids matches the assigned power strip socket numbers stored in the inventory tracking database. The determination of whether each assigned tracking pod id matches its assigned power strip socket number is performed at step 408. If each reported tracking pod id matches its assigned power strip socket number then it is assumed that all of the attached assets are disposed correctly in the enclosure, system or location and the process returns to step 402 to determine whether all of the power-strips at the particular location have been polled. Otherwise, if a reported tracking pod id does not match its assigned power strip socket number as mapped in the inventory database, then the process proceeds to step 410 where the controller device will issue an exception or a programmed alarm indicating that the attached asset may be incorrect or not in its correct location.

In accordance with the foregoing detailed description, the system thus tracks equipment that has been registered in an inventory database without any user involvement. Once registered and connected into the system's power strip, the equipment's location will be easily tracked without human intervention. This information may be used to locate systems in need of up grade, repair or relocation, and further can verify that the correct equipment was moved and that it was moved to the correct location.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what I claim as new, and desire to secure by Letters Patent is:

1. A system for automatically tracking connectivity of one or more electrically-powered devices to a power source device, said power source device including a plurality of receptacle means, each receptacle means for providing AC power to one or more an electrically-powered devices connected thereto, said system comprising:

a plurality of identification devices, each identification device for connection with an electrically-powered device, and each further connected to a single receptacle means of said power source device, each identification device adapted for receiving and providing AC power to its connected electrically-powered device, and each identification device further and having a unique identifier associated therewith for identifying its corresponding attached electrically-powered device;

a communications system for enabling transfer of message signals between said power source device and each attached identification device via its respective connected receptacle means, said communication system further adapted to receive message signals from a tracking control device for generating a query message signal requesting identification of each electrically-powered device attached to said power source device, each attached identification device receiving a query message signal from said power source via its respective connected receptacle means and communicating a response signal including its unique identifier for receipt by said control device for tracking the device connected with said receptacle means of said power source device;

said tracking control device comprising:

a means for providing a mapping of each unique identifier associated with identification devices with a predetermined connected receptacle means at said power source device and, a means for comparing each unique identifier communicated in said response message signal against said mapped predetermined connected receptacle means, said system further verifying whether the unique identifier is associated with a device predetermined as being connected to that receptacle; and said communications system including a first communications sub-system means provided in said power source device for receiving network communications signals from said tracking control device via a network interface according to a network communications protocol and generating said query message signal for transmission to an identification device via its respective connected receptacle means, said query message signal generated according to a modulation scheme for transmission with alternating current power signals provided by said power source for receipt by said attached identification device; and, a multiplexor means responsive to a control signal for enabling said query message signal to be transmitted to a specific one of said plurality of receptacle means provided with said power source device for transmission to a targeted identification device and, enabling a response signal including its unique identifier to be communicated from a specific one of said plurality of receptacle means for transmission back to said control device.

2. The system for automatically tracking connectivity of one or more electrically-powered devices as claimed in claim 1, wherein said tracking control device generates an alarm message when a unique identifier is received from an identification device connected with an identified receptacle means other than said predetermined connected receptacle means.

3. The system for automatically tracking connectivity of one or more electrically-powered devices as claimed in claim 1, wherein said network communications protocol is a wired communications protocol.

4. The system for automatically tracking connectivity of one or more electrically-powered devices as claimed in claim 1, wherein said network communications protocol is a wireless communications protocol.

5. The system for automatically tracking connectivity of one or more electrically-powered devices as claimed in claim 1, wherein said modulation scheme is an orthogonal frequency division multiplexing (OFDM) modulation scheme.

6. The system for automatically tracking connectivity of one or more electrically-powered devices as claimed in claim 1, further comprising means for coupling a generated query message signal from said analog multiplexor means to a specific receptacle means provided with said power source device.

7. The system for automatically tracking connectivity of one or more electrically-powered devices as claimed in claim 1, wherein said communications system comprises a second communications sub-system means provided in said identification device for receiving said query message signal from said first communication sub-system and generating said response signal including said unique identifier for transmission back to said first communication sub-system.

8. The system for automatically tracking connectivity of one or more electrically-powered devices as claimed in claim 1, further comprising means for fixedly securing an identification device with a respective power receptacle provided with an electrically-powered device.

9. A method for automatically tracking connectivity of one or more electrically-powered devices to a power source device, said power source device including a plurality of recentacle means for receiving and providing AC power to one or more an electrically-powered devices connected thereto, said method comprising the steps of:

providing a plurality of identification devices, each identification device for connection with an electrically-powered device, and each further connected to a single receptacle means for receiving and providing AC power to its respective electrically-powered device, each identification device further and having a uniQue identifier associated therewith for identifying its corresponding attached electrically-powered device;

providing said power source device with a network interface for receiving signals from a tracking control device over a network connection according to a network communications protocol, generating a query message signal for transmission to an identification device via its respective connected receptacle means, said query message signal generated according to a modulation scheme for transmission with alternating current power signals provided by said power source for receipt by said attached identification device;

communicating said query message signal via a receptacle means to an attached identification device for receipt thereof, said query message signal requesting identification of each electrically-powered device attached to said power source device; and, communicating a response message signal including a unique identifier for said identification device back to said tracking control device via the attached said receptacle means of the power source device; and, verifying, by said tracking control device. whether the unique identifier is associated with an equipment predetermined as being connected with said receptacle means of said power source device; and, mapping unique identifiers associated with identification devices connected to corresponding electrically-powered devices connected with predetermined receptacle means at said power source device, said verifying step comprising: comparing each unique identifier communicated in said response message signal via a respective connected identified receptacle means against said mapped predetermined receptacle means, wherein said step of communicating said query message comprises the steps of:

coupling said query message signal to a specific one of said plurality of receptacle means provided with said power source device for transmission to a targeted identification device and, coupling a received response message signal including its unique identifier from a specific one of said plurality of receptacle means for transmission back to said tracking control device.

10. The method for automatically tracking connectivity of one or more electrically-powered devices as claimed in claim 9, further comprising the step of generating an alarm message when a unique identifier is received from an identification device connected with an identified receptacle means other than said predetermined connected receptacle means.

11. The method for automatically tracking connectivity of one or more electrically-powered devices as claimed in claim 9, wherein said modulation scheme is an orthogonal frequency division multiplexing (OFDM) modulation scheme.

12. The method for automatically tracking connectivity of one or more electrically-powered devices as claimed in claim 9, wherein said coupling steps further includes the step of implementing analog multiplexing for transmitting said query message signal a specific one of said plurality of receptacle means and receiving response message signals from a targeted identification device.

13. A system for managing inventory of electrically-powered devices serviced by an electrical power source, the system comprising:
   a power source device having a plurality of power line receptacles adapted for distributing power from said electrical power source to each of electrically-powered devices;
   a plurality of identification devices each for attachment to an electrically-powered device and connected to a power line receptacle for providing electrical power to a respective device via said receptacle, each said identification device including a unique identifier associated therewith indicating its connected electrically-powered device;
   an inventory management control device that communicatively couples to each of the plurality of identification devices via a respective power line receptacle over a communications link, said power source device including a network interface for receiving network communications signals from said inventory management control device according to a network communications protocol,
   wherein the inventory management control device communicates with each of the identification devices to determine the unique identifier of the connected identification device, Thereby tracking the electrically-powered device connected to the receptacle of the power source device, said inventory management control device comprising:
   means for polling each power source device with a query message signal for determining unique identifiers of identification devices connected to its power line receptacles,
   a multiplexor means responsive to a control signal for enabling said ciuerv message signal to be transmitted to a specific one of said plurality of receptacle means provided with said power source device for transmission to a targeted identification device and, enabling a response signal including its unique identifier to be communicated from a specific one of said plurality of receptacle means for transmission back to said inventory management control device, said query message signal transmitted to an identification device via its respective connected receptacle means according to a modulation scheme for transmission with alternating current power signals provided by said power source for receipt by said attached identification device;
   wherein each said connected identification device generates a response message signal providing its unique identifier to said control device;
   means providing a mapping of each unique identifier associated with identification devices predetermined as being connected to a power line receptacle at said power source device; and,
   means for comparing each unique identifier communicated in said response message signal against said mapped predetermined connected receptacle for verifying whether the unique identifier is associated with a device predetermined as being connected that power line receptacle.

14. The system for managing inventory of electrically-powered devices as claimed in claim 13, wherein said inventory management control device comprises means for generating an alarm message when a unique identifier received from an identification device does not correspond to an electrically-powered device predetermined as being connected to that receptacle.

15. The system for managing inventory of electrically-powered devices as claimed in claim 13, wherein said communications link includes a networked communications connection for communicating signals between said inventory management control device and said power source device, said power source device finther comprising:
   means responsive to received query message signals for generating signals adapted for communication to an attached identification device via a power line receptacle over a power line connection providing power to said electrically-powered device.

16. The system for managing inventory of electrically-powered devices as claimed in claim 15, wherein said network communications link for communicating signals between said inventory management control device and said power source device is adapted to communicate signals according to a wired network communications protocol.

17. The system for managing inventory of electrically-powered devices as claimed in claim 15, wherein said network communications link for communicating signals between said inventory management control device and said power source device is adapted to communicate signals according to a wireless network communications protocol.

18. A method for managing inventory of electrically-powered devices serviced by an electrical power source comprising the steps of:
   a) providing a power source device having a plurality of power line receptacles adapted for distributing power from said electrical power source to each of electrically-powered devices;
   b) providing a plurality of identification devices each for attachment to an electrically-powered device and connected to a power line receptacle for providing electrical power to a respective device via said receptacle, each said identification device including a unique identifier associated therewith indicating its connected electrically-powered device;
   providing a mapping of each unique identifier associated with identification devices predetermined as being connected to a power line receptacle at said power source device, and,
   c) communicatively coupling an inventory management control device to each of the plurality of identification devices via a respective power line receptacle over a communications link, said power source device including a network interface for receiving network communications signals from said inventory management control device according to a network communications protocol, said inventory management control device communicating with each of the identification devices to determine the unique identifier of the connected identification device, thereby tracking the electrically-powered device connected to the receptacle of the power source device,
   said communicatively coupling comprises the step of:
   polling each power source device with a query message signal for determining unique identifiers of all identification devices connected to its power line receptacles, each said connected identification device, in response, generating a response message signal providing its unique identifier to said control device,
   enabling, via a multiplexor device, said query message signal to be transmitted to a specific one of said plurality of receptacle means provided with said power source device for transmission to a targeted identification device and, enabling a response signal including its unique identifier to be communicated from a specific one of said plurality of receptacle means for transmission back to said inventory management control device, said query message signal transmitted to an identification device via its respective connected receptacle means according to a modulation scheme for transmission with alternating current power signals provided by said power source for receipt by said attached identification device; and, comparing each unique identifier communicated in said response message signal against said mapped predetermined connected power-line receptacle for verifying whether the unique identifier is associated with a device predetermined as being connected that power line receptacle.

19. The method for managing inventory of electrically-powered devices as claimed in claim 18, thither comprising the step of: generating an alarm message when a unique identifier received from an identification device does not correspond to an electrically-powered device predetermined as being connected to that receptacle.

20. The system for managing inventory of electrically-powered devices as claimed in claim 18, wherein said communications link includes a network communications connection for communicating signals between said inventory management control device and said power source device, said method thither comprising the step of:

generating signals adapted for communication to an attached identification device via a power line receptacle over a power line connection providing power to said electrically-powered device in response to a received query message signal.

* * * * *